(12) United States Patent
Shanbhag

(10) Patent No.: US 12,094,446 B2
(45) Date of Patent: *Sep. 17, 2024

(54) LINK-BASED AUDIO RECORDING, COLLECTION, COLLABORATION, EMBEDDING AND DELIVERY SYSTEM

(71) Applicant: NAMECOACH, INC., Palo Alto, CA (US)

(72) Inventor: Praveen Shanbhag, Stanford, CA (US)

(73) Assignee: NAMECOACH, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/228,901

(22) Filed: Aug. 1, 2023

(65) Prior Publication Data

US 2023/0386444 A1    Nov. 30, 2023

Related U.S. Application Data

(63) Continuation of application No. 17/068,130, filed on Oct. 12, 2020, now Pat. No. 11,715,455, which is a (Continued)

(51) Int. Cl.
*G10L 15/22* (2006.01)
*G06F 40/134* (2020.01)
(Continued)

(52) U.S. Cl.
CPC ............ *G10L 13/02* (2013.01); *G06F 40/134* (2020.01); *G06F 40/58* (2020.01); *G06Q 10/10* (2013.01)

(58) Field of Classification Search
None
See application file for complete search history.

(56) References Cited

U.S. PATENT DOCUMENTS 5,566,272 A    10/1996    Brems
5,758,322 A    5/1998    Rongley
(Continued)

OTHER PUBLICATIONS

Wikipedia HTML5 web page (May 3, 2014 archive of http://en/wikipedia.org/wiki/HTML5.
(Continued)

*Primary Examiner* — Neeraj Sharma
(74) *Attorney, Agent, or Firm* — Travis Banta; Loyal IP Law, PLLC

(57) ABSTRACT

A machine has a processor and a memory connected to the processor. The memory stores instructions executed by the processor to supply a name page in response to a request from an administrator machine. Name page updates are received from the administrator machine. The name page updates include participants and associated network contact information for the participants. A code is utilized to form a link to the name page. Prompts for textual name information and audio name information are supplied to a client machine that activates the link to the name page. Textual name information and audio name information are received from the client machine. The textual name information and audio name information are stored in association with the name page. Navigation tools are supplied to facilitate access to the textual name information and audio name information.

20 Claims, 15 Drawing Sheets

Related U.S. Application Data continuation of application No. 16/160,533, filed on Oct. 15, 2018, now abandoned, which is a continuation of application No. 14/714,184, filed on May 15, 2015, now Pat. No. 10,147,414.

(60) Provisional application No. 61/994,022, filed on May 15, 2014.

(51) Int. Cl.
  *G06F 40/58* (2020.01)
  *G06Q 10/10* (2023.01)
  *G10L 13/02* (2013.01)

(56) References Cited

U.S. PATENT DOCUMENTS

| | | | |
|---|---|---|---|
| 6,012,030 | A | 1/2000 | French-St. George |
| 6,144,938 | A | 11/2000 | Surace |
| 6,223,156 | B1 | 4/2001 | Goldberg |
| 6,496,107 | B1 * | 12/2002 | Himmelstein ......... G07C 9/257 726/19 |
| 6,757,362 | B1 | 6/2004 | Cooper |
| 6,839,669 | B1 * | 1/2005 | Gould ..................... G10L 15/22 704/E15.04 |
| 7,167,544 | B1 | 1/2007 | Bauer |
| 7,321,856 | B1 | 1/2008 | Porter |
| 8,543,407 | B1 | 9/2013 | Gagnon |
| 8,827,712 | B2 | 9/2014 | Mack |
| 8,873,721 | B2 | 10/2014 | Redfern et al. |
| 9,188,456 | B2 | 11/2015 | Vaghefinazari |
| 9,646,606 | B2 * | 5/2017 | Peng ....................... G10L 15/08 |
| 9,959,870 | B2 * | 5/2018 | Hunt ....................... G10L 15/26 |
| 10,762,293 | B2 * | 9/2020 | Ramerth ............... G06F 40/232 |
| 11,138,971 | B2 * | 10/2021 | Wetsel .................... G10L 15/22 |
| 2002/0194260 | A1 | 12/2002 | Headley |
| 2005/0033582 | A1 | 2/2005 | Gadd |
| 2005/0275505 | A1 | 12/2005 | Himmelstein |
| 2007/0220140 | A1 | 9/2007 | Weidenschlager |
| 2008/0112542 | A1 * | 5/2008 | Sharma ............... H04M 3/4938 379/1.02 |
| 2009/0106368 | A1 | 4/2009 | Padveen |
| 2009/0323906 | A1 | 12/2009 | Jaiswal |
| 2009/0326957 | A1 | 12/2009 | Yang |
| 2010/0110489 | A1 | 5/2010 | Kanda |
| 2012/0173251 | A1 | 7/2012 | Gillin |
| 2013/0055357 | A1 | 2/2013 | Etchegoyen |
| 2013/0090921 | A1 | 4/2013 | Wei-Ting |
| 2013/0325453 | A1 | 12/2013 | Levien |
| 2014/0019127 | A1 | 1/2014 | Park |
| 2014/0358544 | A1 | 12/2014 | Printz |
| 2015/0006178 | A1 | 1/2015 | Peng |
| 2015/0228275 | A1 | 8/2015 | Watanabe |

OTHER PUBLICATIONS

Wikipedia Adobe Flash web page (May 3, 2014 archive of http://en.wikipedia.org/wiki/Adobe_Flash).
Web page Audio Extractor (Feb. 8, 2014 archive of http://audio-extractor.net).
Web page Eventbrite (Nov. 30, 2015 archive of http://web.archive.org/web/20140501101034/https://www.eventbrite.com/features/).
Web page Eventbrite (Sep. 12, 2016 archive of http://web.archive.org/web/20140426044821/http://help.eventbrite.com/customer/).

* cited by examiner

FIG. 3

HOME  ABOUT  FAQ  OUR SERVICES ▾  DASHBOARD  ACCOUNT ▾

📢 DASHBOARD FOR *PRAVEEN SHANBHAG*

| YOUR NAME PAGES | YOUR NAME GUIDES |

302 — CREATE A NAME PAGE:

TITLE (E.G., 'STANFORD GRADUATION' OR 'ST. XAVIER HS') | 📅 DATE — 304 | * | EVENT CODE (OPTIONAL) — 306

CREATE NAME PAGE

NAME PAGES YOU ADMINISTER:

| TEST WEDDING | OCT 31, 2012 | ✎ Edit | SEE ALL ADMINS | GO › |
| TEST WEDDING 3 | JAN 19, 2013 | ✎ Edit | SEE ALL ADMINS | GO › |
| TEST WEDDING 2 | JAN 23, 2013 | ✎ Edit | SEE ALL ADMINS | GO › |
| TEST REAL PAGE 2 | FEB 11, 2013 | ✎ Edit | SEE ALL ADMINS | GO › |
| TEST REAL PAGE | FEB 18, 2013 | ✎ Edit | SEE ALL ADMINS | GO › |
| OLD ETL SEMINAR | FEB 20, 2013 | ✎ Edit | SEE ALL ADMINS | GO › |

308

CONTACT US!

NAME PAGE: YOUR SCHOOL/PROGRAM'S COMMENCEMENT
MAY 25, 2013

STATS:
RECORDED: 17
UNRECORDED: 8
REQUESTED: 6
TOTAL: 31

RECORDED NAMES | UNRECORDED NAMES | NAMES REQUESTED | REQUEST NAMES/YOUR LINK | ADMINS | DELETED ENTRIES

ADMINS FOR THIS EVENT:

NOTE: ADMINS CAN REQUEST NAME RECORDINGS (ACCESS TO THE 'REQUEST NAMES/YOUR LINK' TAB).
INVITE OTHERS TO BE ADMINS (ACCESS TO THIS 'ADMINS' TAB), AND LISTEN TO RECORDINGS.

| | | |
|---|---|---|
| PRAVEEN | SHANBHAG | SHANBHAGP@AOL.COM |
| HOWARD | RICHARDS | DEAN_RICHARDS@EXAMPLE.COM ⊘ |

☑ Invite an admin for this event:

FIRST NAME (RECOMMENDED)

LAST NAME (RECOMMENDED)

EMAIL (REQUIRED)

[ INVITE ADMIN ]

CONTACT US!

FIG. 4

NAMECOACH
HEAR THE NAME, SAY IT RIGHT    HOME  ABOUT  FAQ  OUR SERVICES˅  MY NAMEBADGE  DASHBOARD  ACCOUNT˅

FORMATTING REQUIREMENTS FOR EXCEL OR CSV FILE:

- FIRST ROW SHOULD BE A HEADER ROW
  - REQUIRED HEADER: 'EMAIL'
  - OPTIONAL HEADER: 'FIRST_NAME'
  - OPTIONAL HEADER: 'LAST_NAME'

EXAMPLE: EXCEL FILE WITH EMAIL, FIRST_NAME, AND LAST_NAME

EXAMPLE: CSV FILE WITH ONLY EMAIL

- EVERY ROW (EXCEPT HEADER ROW) SHOULD CONTAIN A VALID EMAIL ADDRESS, UNDER THE 'EMAIL' HEADER
  (NO BLANK ROWS ALLOWED)
- EMAILS SHOULD NOT CONTAIN BLANK SPACES.
- ALLOWED FILE EXTENSIONS:
  - .XLS
  - .XLSX
  - .CSV

SELECT A FILE:
CHOOSE FILE   NO FILE CHOSEN
UPLOAD FILE

| RECORDED NAMES | UNRECORDED NAMES | NAMES REQUESTED | REQUEST NAMES/YOUR LINK | ADMINS | DELETED ENTRIES |
|---|---|---|---|---|---|
| (17 STUDENTS WHO HAVE RECORDED THEIR NAME) | | | | | |
| STUDENT NAME/EMAIL | STUDENT'S NOTES | | | | |
| PRAVEEN BOMMANNAVAR (BOMMANNA@GMAIL.COM) | (PLEASE DON'T SAY PRO-VEEN) | | | | |
| RAHUL CHAUDHRI (RAHUL@EXAMPLE.COM) | THE D IS SOFT | | | | |
| SICONG CHEN (JASICHEN@IASTATE.EDU) | 'SI' SOUNDS LIKE 'S' IN 'SCORE', 'C' DOES NOT SOUND LIKE 'K' | | | | |
| TRI CHIEM (TCHIEM@GMAIL.COM) | FIRST NAME SOUNDS LIKE TREE (LIKE THE PLANT), LAST NAME LIKE CHEEM (LIKE THE FIRST SYLLABLE IN "CHIMNEY") | | | | |
| CECILIA DOMENIGHINI (DOMENIGHINI@NAME-COACH.COM) | THE FIRST SYLLABLE OF MY FIRST NAME SOUNDS LIKE THE FIRST SYLLABLE OF "CHERRY" | | | | |
| ARSHKIT DULLAT (ARSHKIT@NAME-COACH.COM) | FIRST NAME SOUNDS LIKE "ARSH-KEET" LAST NAME SOUNDS LIKE "DU-LUTT" | | | | |
| KARLA GLEICHAUF (KGLEICH@GMAIL.COM) | MY LAST NAME SOUNDS LIKE "GLI-COUGH" | | | | |
| HIND KATKHUDA (HINDKAT@GMAIL.COM) | FIRST NAME IS THE EASY ONE, SOUNDS LIKE WIND | | | | |
| LILJA MAGNUSDDTTIR | | | | | |

RECORDED: 17
UNRECORDED: 8
REQUESTED: 6
TOTAL: 31

RECORDED: 17
UNRECORDED: 8
REQUESTED: 6
TOTAL: 31

| RECORDED NAMES | UNRECORDED NAMES | NAMES REQUESTED | REQUEST NAMES/YOUR LINK | ADMINS | DELETED ENTRIES |
|---|---|---|---|---|---|

(17 STUDENTS WHO HAVE RECORDED THEIR NAME)

| NAME PRONUNCIATION (PRESS PLAY BUTTON TO HEAR) | ADMIN NOTES (CLICK ON A FIELD TO EDIT) | ACTIONS |
|---|---|---|
| ▶ PRAVEEN BOMMANNAVAR | : | ☐ ☐ ☐ |
| ▶ RAHUL CHAUDHRI | -CLICK TEXT TO ENTER OR EDIT NOTES- | ☐ ☐ ☐ |
| ▶ SICONG CHEN | -CLICK TEXT TO ENTER OR EDIT NOTES- | ☐ ☐ ☐ |
| ▶ TRI CHIEM | -CLICK TEXT TO ENTER OR EDIT NOTES- | ☐ ☐ ☐ |
| ▶ CECILIA DOMENIGHINI | -CLICK TEXT TO ENTER OR EDIT NOTES- | ☐ ☐ ☐ |
| ▶ ARSHKIT DULLAT | -CLICK TEXT TO ENTER OR EDIT NOTES- | ☐ ☐ ☐ |
| ▶ KARLA GLEICHAUF | -CLICK TEXT TO ENTER OR EDIT NOTES- | ☐ ☐ ☐ |
| ▶ HIND KATKHUDA | -CLICK TEXT TO ENTER OR EDIT NOTES- | ☐ ☐ ☐ |
| ▶ LILJA MAGNUSDDTTIR | | |

| ⊿ | A | B | C | D |
|---|---|---|---|---|
| 1 | FIRST NAME | MIDDLE NAME(S) | LAST NAME | EMAIL |
| 2 | A | | AAA | ipad3@example.com |
| 3 | ASDF | | AASDF | fasdfad23adscdandroicbt@ex |
| 4 | DAFS | | ADFSEW | awefehahw@example.com |
| 5 | RGAERGVR | | AFRAGER | rgaezdvzae@example.com |
| 6 | ASDF | | ASDF | afsd234r2q4tawg@example.com |
| 7 | SAMSUNG | | ASDF | samsung232323@example.com |
| 8 | ASDF | | ASDFIPHONE | asdf23332eafast@example.com |
| 9 | ASDF | | ASF | 322323dfffffffffffffffffffffffffffffff |
| 10 | B | | B | bbcurve9930@example.com |
| 11 | XX | | B | ipadair@example.com |
| 12 | B | | B | bbcurve9300@example.com |
| 13 | PAUL | | BUCHHEIT | Pb@example.com |
| 14 | C | | D | 43sfff43qr4@example.com |
| 15 | D | | D | asdfawwrffwawe2example.com |
| 16 | DF | | DF | nokia443@example.com |
| 17 | FJDJF | | DJDJF | skfusbaorbsujz@example.com |
| 18 | EE | | E | ipad4@example.com |
| 19 | WE | | E | pravenn@voicegems.com |
| 20 | AFWEF | | EAFAWE | lmpaodbnewabhi@example.com |
| 21 | F | | F | ipadmini@example.com |
| 22 | F | | F | fgfrtgfff@example.com |
| 23 | T | | F | thczawryhbnj@example.com |
| 24 | F | | FFF | ipad2-5@example.com |
| 25 | HOG | | IF | vjgffyevimdfyur@example.com |
| 26 | TEST | | IPHONECBTTE | testiphonecbt@eample.com |
| 27 | NOKIA | | LUMIA | windowstest2@example.com |
| 28 | NOKIA | | LUMIA710 | windows1@example.com |
| 29 | TEST | | NOKIA | nokia601t1@example.com |
| 30 | ASDF | | OPERA | opera323@example.com |
| 31 | RR | | R | ipadmini2@example.com |
| 32 | RRR | | RRR | praveen+2@name-coach.com |
| 33 | P | | S | asdf43qr43qiuu@exmple.com |
| 34 | ASDFD | | SADF | 4q3reaf3qrdfst@example.com |

LINK-BASED AUDIO RECORDING, COLLECTION, COLLABORATION, EMBEDDING AND DELIVERY SYSTEM

CROSS-REFERENCE TO RELATED APPLICATIONS

This application is a continuation of co-pending U.S. Pat. No. 11,715,455 filed on Oct. 12, 2020, which is a continuation of and claims benefit and priority to U.S. patent application Ser. No. 16/160,533, now abandoned, which is a continuation of and claims benefit and priority to U.S. Pat. No. 10,147,414 filed on May 15, 2015, which is a non-provisional filing that claims benefit and priority to U.S. Provisional Patent Application 61/994,022, filed on May 15, 2014, which are each incorporated herein by reference in their entireties, including but not limited to those portions that specifically appear hereinafter, the incorporation by reference being made with the following exception: In the event that any portion of the above-referenced applications are inconsistent with this application, this application supersedes any portion of the above referenced applications.

FIELD OF INVENTION

This invention relates generally to accessing information in computer networks. More particularly, this invention relates to textual name information and audio name information that is collected and accessed via computer networks.

BACKGROUND OF THE INVENTION

The United States and other heterogeneous societies have citizens from diverse cultures and associated languages. This may create challenges when a speaker of one language is forced to pronounce a name originating from a second language. Tus, there is a need to provide textual and audio guidance in such circumstances. More particularly, such guidance should be easily accessible via a computer network.

SUMMARY OF THE INVENTION

A machine has a processor and a memory connected to the processor. The memory stores instructions executed by the processor to supply a name page in response to a request from an administrator machine. The name page updates include participants and associated network contact information for the participants. A code is utilized to form a link to the name page. Prompts for textual name information and audio name information are supplied to a client machine that activates the link to the name page. Textual name information and audio name information are received from the client machine. The textual name information and audio name information are stored in association with the name page. Navigation tools are supplied in response to a request from at least one of the administrator machine and the client machine. The navigation tools facilitate access to the textual name information and the audio name information.

BRIEF DESCRIPTION OF THE FIGURES

The invention is more fully appreciated in connection with the following detailed description taken in conjunction with the accompanying drawings, in which:

FIG. 3 is an interface for creating, listing and editing name pages in accordance with an embodiment of the invention.
FIG. 4 is an interface to invite additional administrators of a name page.
FIG. 9 is an interface to associate name information for a single individual with multiple name pages.
FIG. 10 is an interface with navigation tools utilized in accordance with an embodiment of the invention.

DETAILED DESCRIPTION OF THE INVENTION

Figure 1:
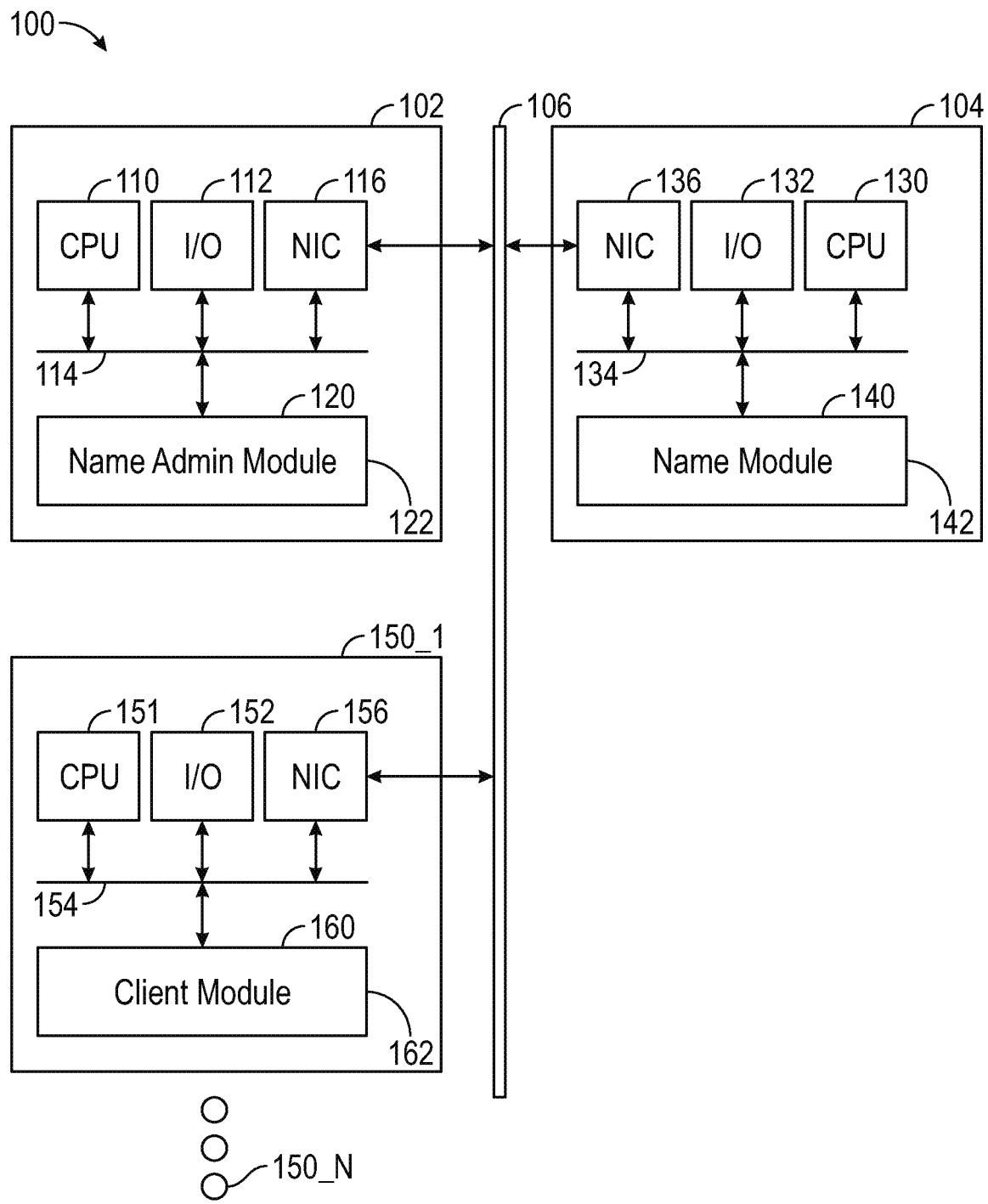
FIG. 1 illustrates a system configured in accordance with an embodiment of the invention.

FIG. 1 illustrates a system 100 configured in accordance with an embodiment of the invention. The system 100 includes a first computer 102 which accesses a server 104 via a network 106, which may be any combination of wired and wireless networks. The first computer 102 includes standard components, such as a central processing unit 110 and input/output devices 112 linked by a bus 114. The input/output devices 112 may include a keyboard, mouse, touch display and the like. A network interface circuit 116 is also connected to bus 114 to supply connectivity to network 106. A memory 120 is also connected to the bus 114. The memory 120 stores instructions executed by central processing unit 110. In one embodiment, the memory 120 stores a name administrator module 122, which includes instructions to support the administration of operations associated with textual and audio information about a name, as discussed below. By way of example, a school administrator or employer may operate computer 102.

Server 104 also includes standard components, such as a central processing unit 130, input/output devices 132, bus 134 and network interface circuit 136. A memory 140 is connected to bus 134. The memory 140 stores instructions executed by central processing unit 130. In one embodiment, the memory 140 stores a name module 142. The name module 142 is a repository of textual and audio information about a name. The name module also supports various operations to collect and provide access to this information, as discussed below.

System 100 also includes a set of client machines 150_1 thorough 150_N. Each client machine (generically referenced as machine 150) includes standard components, such as a central processing unit 151, input/output devices 152, bus 154, and network interface circuit 156. A memory 160 is connected to bus 154. The memory stores instructions executed by central processing unit 151. In one embodiment, the memory 160 stores a client module 162. The client module may be a browser or simple application that supplies textual and audio name information to server 104 in response to an invitation. The client module 162 may also provide access to stored textual and audio information associated with the name module 142, as discussed below.

Figure 2:
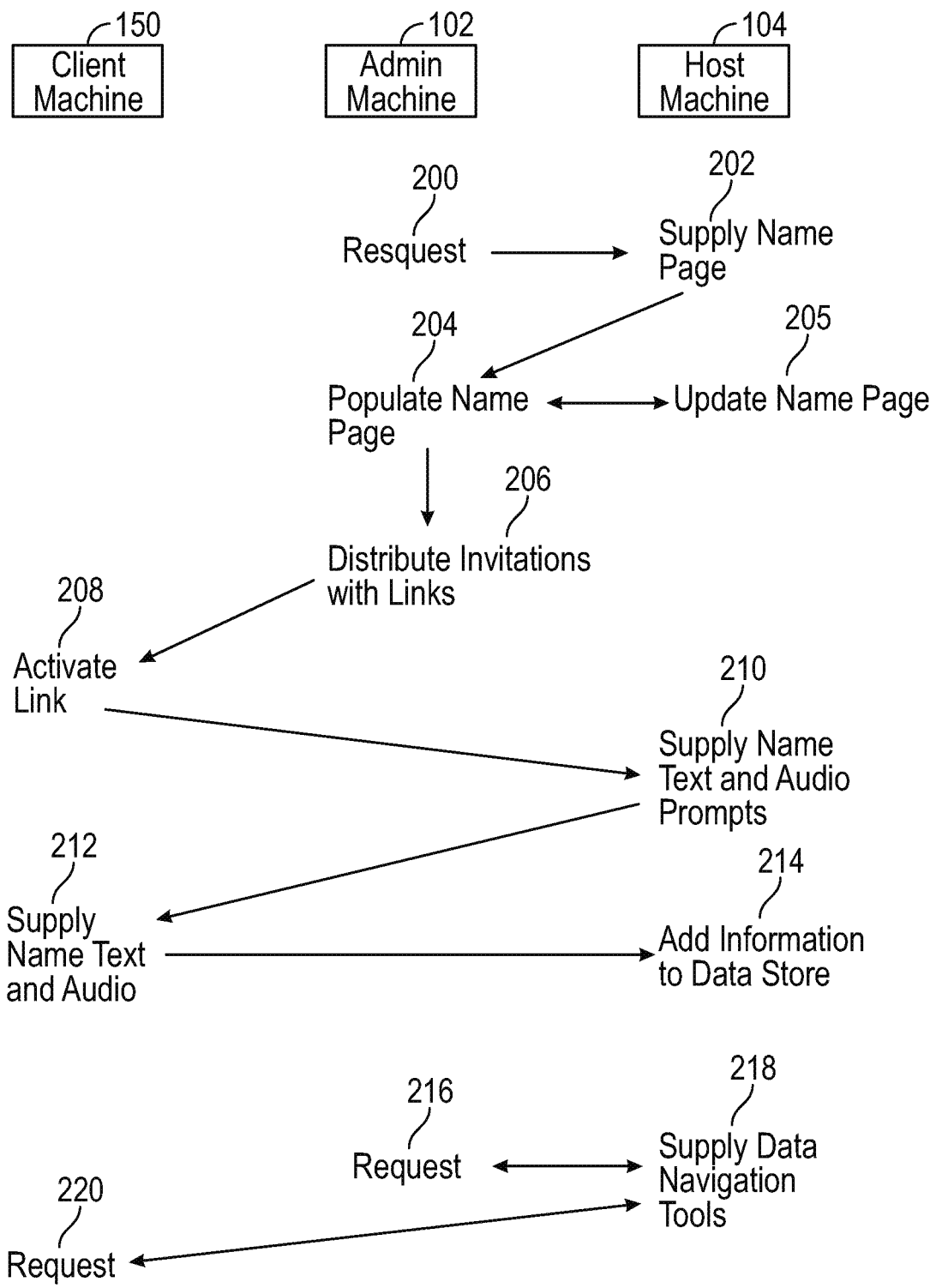
FIG. 2 illustrates processing operations associated with an embodiment of the invention.

FIG. 2 illustrates an exemplary process flow associated with an embodiment of the invention. More particularly, the figure illustrates operations between client machine 150, administrator (admin) machine 102 and host machine 104. The admin machine 102 may initiate a request 200 to the host machine 104. In response to the request, the host machine 104 supplies a name page 202. For example, the name page 202 may be a graduation name page, an employee name page, a new student name page and the like.

The admin machine 102 populates the name page 204. For example, the admin machine 102 may upload a list of names and associated contact information. The host machine 104 receives updated name page information 205. The host machine 104 may also supply such information as an event code.

The admin machine 102 then distributes invitations with one or more links 206. The invitations may be in the form of email communications, SMS text communications and the like. The invitations include one or more links to a name page. As demonstrated below, the name page supplies prompts for audio and textual name information. In an alternate embodiment, the invitations are sent from the host machine 104.

The client machine 150 receives an invitation and activates a link 208 within the invitation. The activation of the link 208 directs the client machine 150 to the host machine 104, which supplies name text and audio prompts 210, as demonstrated below. The client machine 150 supplies textual name information and audio name information 212 in response to the prompts. The textual and audio name information is added to the data store 214 associated with the name module 142. Thereafter a request 216 may be initiated at the admin machine 102 for data store navigation tools 218, which enable a user to access textual and audio name information, as demonstrated below. For example, a speaker at a graduation may access a list of graduating students and associated textual and audio name information. Client machine 150 may initiate a request 220 for navigation tools 218 to allow a user to edit or re-record name information as discussed below.

The following discussion relates to various specific embodiments associated with the apparatus and method discussed above. FIG. 2 illustrates the host machine 104 supplying a name page. The interface 300 includes prompts for an event title 302, an event date 304 and an optional event code 306. The interface 300 may also include a section 308 listing events administered by the user. If a unique event code is not supplied by the user, the name module 142 generates one. Any number of techniques may be used to generate a unique code. One example is a Hexdigest with a recursive uniqueness check.

One administrator can invite another individual to be an administrator for the event. FIG. 4 illustrates an interface 400 to support this operation. The interface 400 includes a section 402 listing event administrators. An invitation section includes a first name prompt 404 and a last name prompt 406 and an email address prompt 408. In one embodiment, the email invitation contains a link with a unique parameter.

Figure 5:
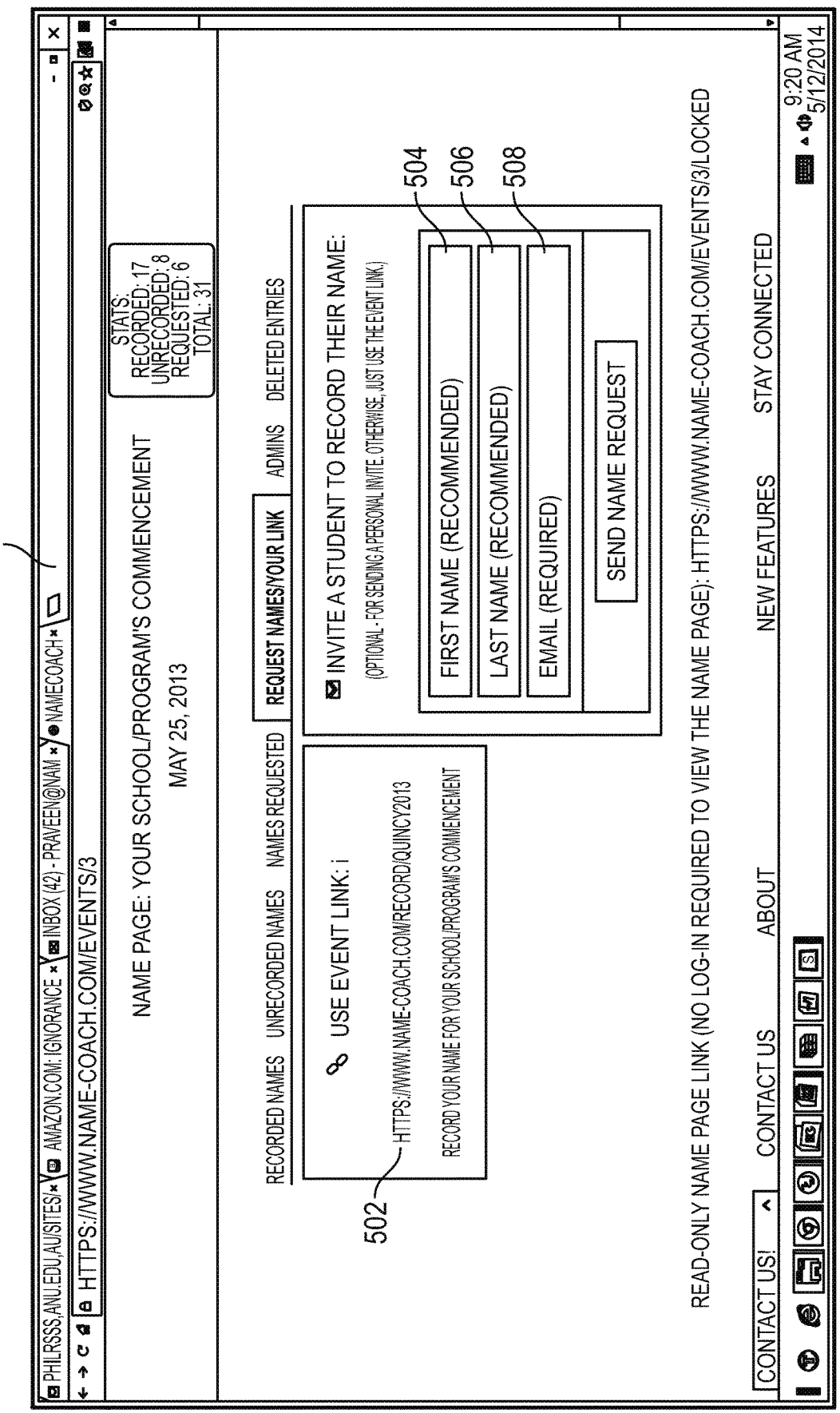
FIG. 5 is an interface with a name page link and prompts for inviting an individual to record a name.

In one embodiment, the original administrator has authority to revoke privileges of a subsequently designated administrator. The foregoing operations correspond to the populate name page action 204 of FIG. 2. Name page population also includes specifying individual to receive invitations to supply name information. FIG. 5 illustrates an interface 500 to coordinate the invitation operation. The interface 500 includes a unique link 502 for the event. The unique link 502 may be a Uniform Resource Locator (URL) generated by the name module 142 that is supplied to the name admin module 122. The interface 500 may also include a section to collect invitee information. The information is subsequently used to send an invitation with a recording link specific to the individual being invited. The section may include a first name prompt 504, a last name prompt 506 and an email address prompt 508. The administrator may then share the link in a number of ways. For example, the link may be published on a website, it may be sent in an email campaign or an SMS text campaign. This operation of sharing the link corresponds to the distribute invitations with links operations 206 of FIG. 2. The activation of a link operation 208 of FIG. 2 may result in the interface 600 of FIG. 6. That is, the host machine 104 supplies name text and audio prompts 210, as shown in FIG. 2. Prior to supplying the interface 600 of FIG. 6, the user may be supplied with a registration page that includes the user's name information and prompts for collecting phonetic spelling of the name and other information about the name.

Figure 6:
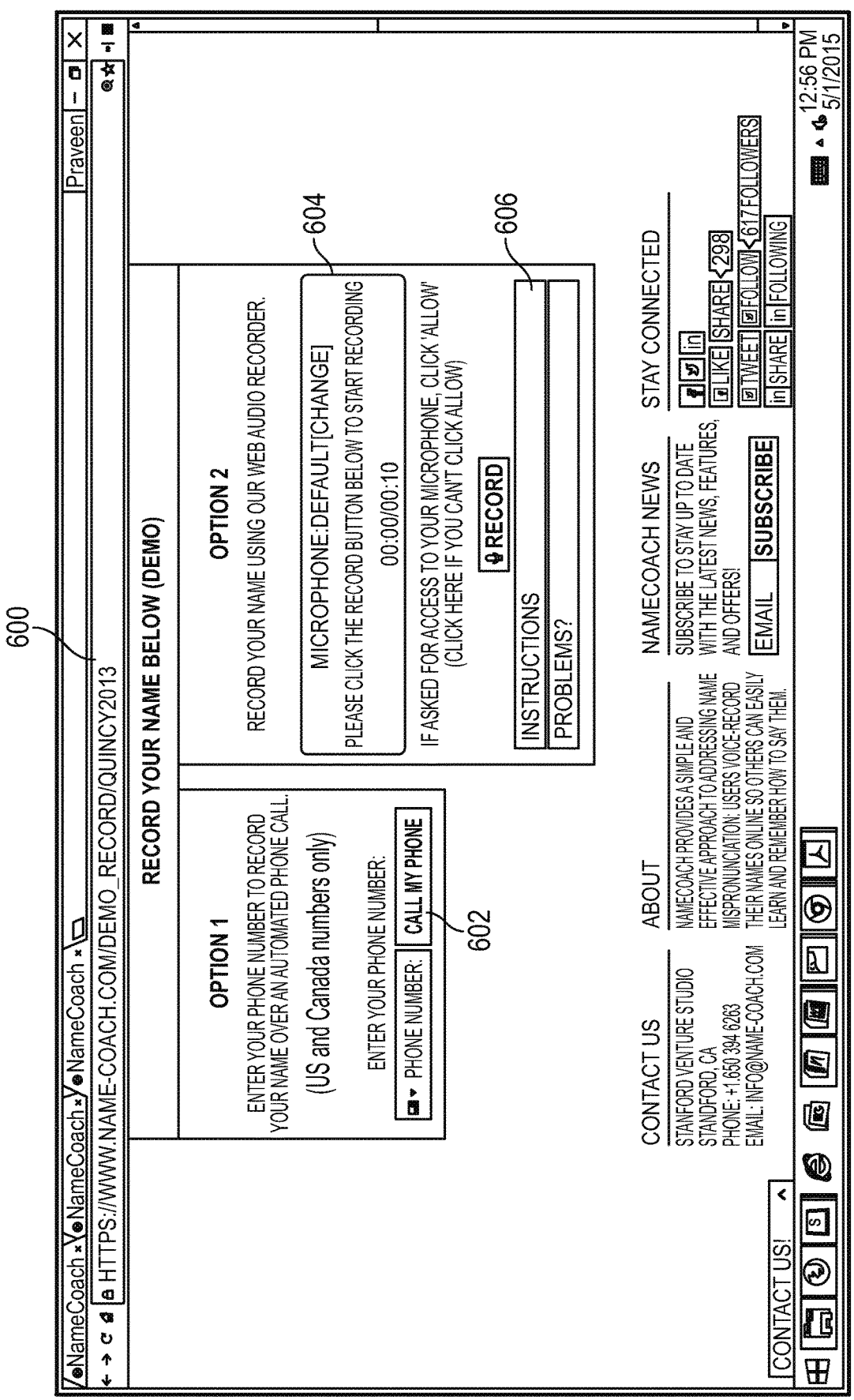
FIG. 6 is an interface with prompts to record name information and collect text information about a name.

FIG. 6 illustrates an interface 600 with prompts for supplying name information. A first prompt 602 requests a telephone number. A second prompt 604 coordinates a web recording. Another prompt 606 allows the specification of textual instructions (e.g., prompts the user to input a phonetic description of a name). Alternatively or in addition, the textual instructions may be collected through a registration page.

In the event that the user enters a telephone number, an automated telephone recording system is invoked. For example, an additional server may be connected to network 106 to supply a telephone recording system that is accessed by the name module 142 via an Application Program Interface (API). In one embodiment, the commercial service Twilio® is used. Twilio® is a cloud communications company based in San Francisco, California. Twilio® facilitates the programmatic making and receiving of telephone calls. Services are accessed via the Twilio API. After a telephone number is entered, the user receives an automated telephone call. The automated telephone call prompts the user to record their name. For example, the user may be prompted to provide a name after a beep and then press # when completed. Keypad options may be supplied to allow a user to listen, record and end a call. Once the call ends, the recording is sent to the name module 142.

Figure 7:
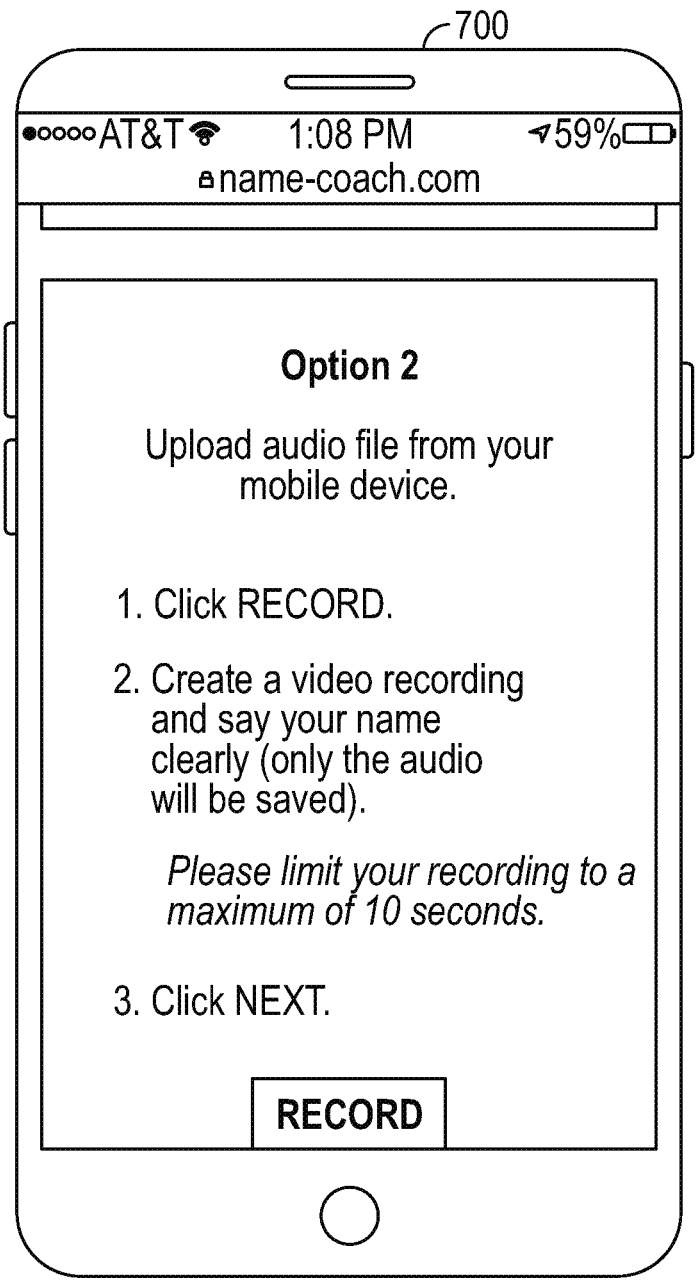
FIG. 7 is an interface with prompts to record name information from a mobile device.

The web based recording may be based upon a Hypertext Markup Language (e.g., HTML5) audio recording. Alternately, an Adobe® Flash® audio record may be used. Another embodiment of the invention utilizes the client's device's native audio/video recorder. On devices where native audio recorder access is not granted to mobile web applications (such as iOS® devices), the user supplies a video. The video file is then processed to strip the audio. FIG. 7 is an exemplary interface 700 which may be used to collect an audio/video utilizing the client device's native audio/video recorder.

Section 606 of interface 600 supplies prompts to a user. The prompts may relate to phonetic spellings, student identification number, graduation date and the like. Alternately or in addition, this information may be collected in a registration page. The collected textual information and voice recording (audio information) constitute a name guide. The user's name guide is associated with the name page to form a name guide. The user's name guide is associated with the name page using a model called a practice object, which associates a user id with an event id (where events are one-to-one mapped to name pages). The name guides/ practice objects are the entries that appear on a name page. The recording link contains the code that uniquely identifies the name page. That code is read as a parameter with the following association: user/recording/nameguide/practiceobject with this particular name page. As shown in operation 212 of FIG. 2, the voice recording and textual information is uploaded to server 104.

Figure 8:
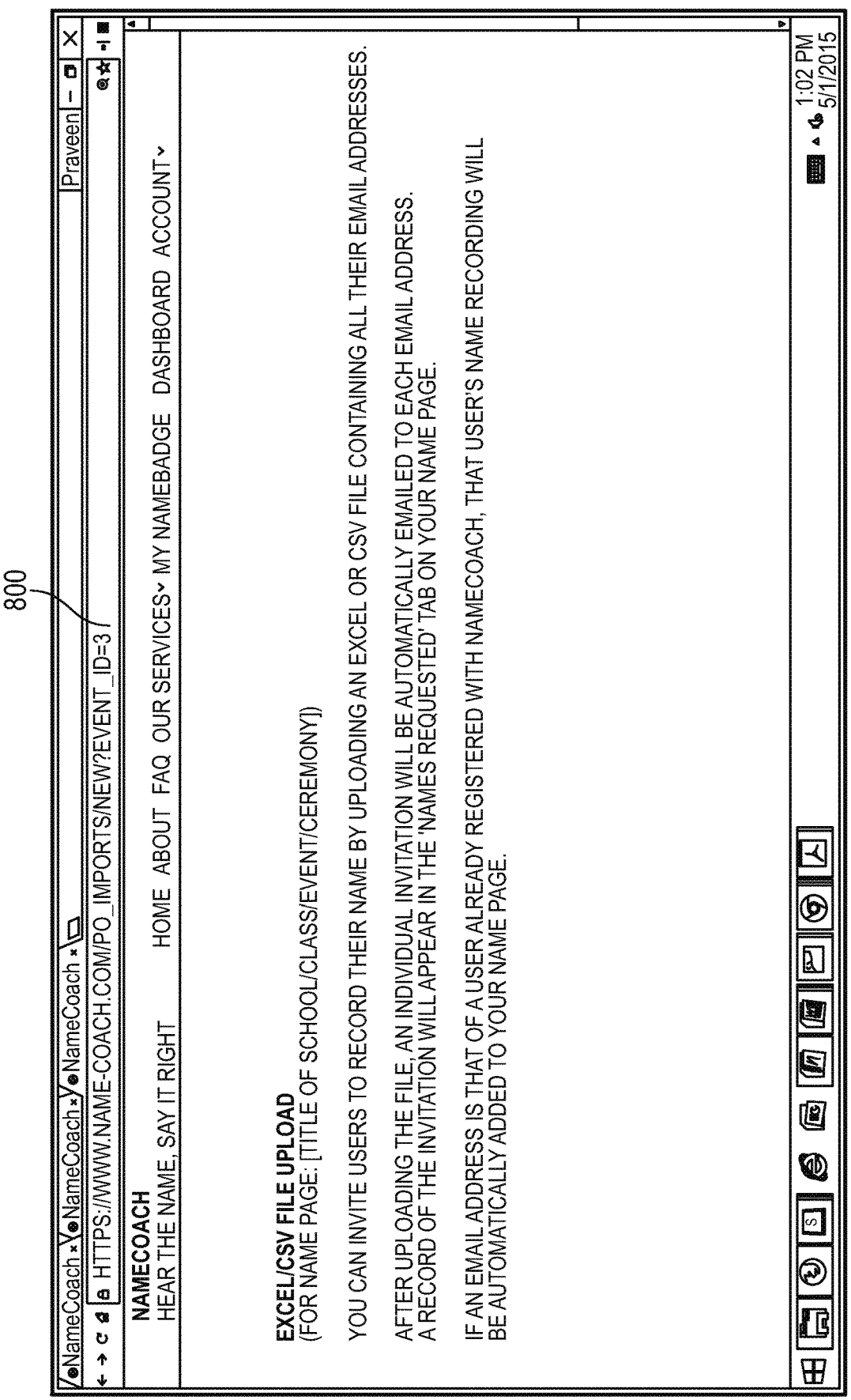
FIG. 8 is an interface to coordinate the upload of name and related information.

Prompts 504, 506, and 508 of FIG. 5 are an example of an individual invite operation. A bulk invite operation may be coordinated through a file upload. FIG. 8 illustrates an interface 800 to coordinate the upload of a file with individual names and contact information. For example, the file may be an Excel® spreadsheet containing email addresses and optionally other information (e.g., first name middle name, last name, and other identifiers, such as school identification). Bulk email invitations may then be sent based upon the file information. The email may be originated from the name admin module or the name module 142.

When an email invitation is generated, a 'Practiceobject' model object is created which references this name page using an event id foreign key, and which contains a unique Hexdigest token. The email contains a unique recording link for this user, which uses this token as a parameter, for example, http://localhost:3000/users/new?token=d347092b4cebe671f249f398275eb320d3884a8c This token is used to identify the Practiceobject when the user signs up, and thus the Name Page for which this user was invited. This system allows identification of the email to which an invitation was sent, to prevent abuse (e.g., recording a misleading NameGuide for another person, recording an inappropriate message, etc.), and to allow Customers/ Admins to track responses and send automated reminders to users to register, record and re-record as needed.

Figure 9:
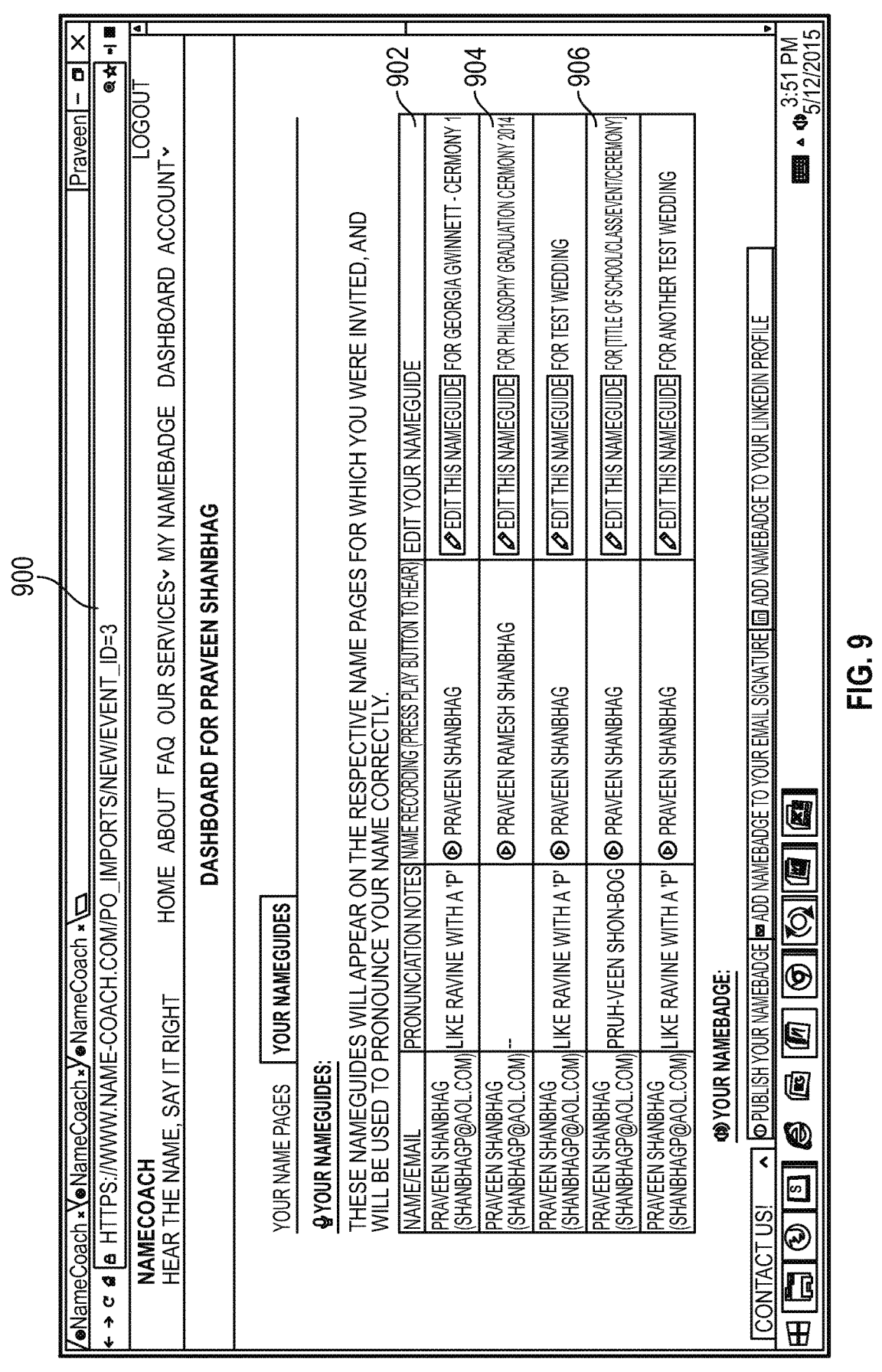

The name module 142 is configured to identify if an email address is already in the system. If so, and that email is associated with a registered user, that user's entry/NameGuide/recording will be copied to the relevant Name Page. If an email is just that of an invited user (for another Name page) who has not yet registered, not only will an invitation be sent again, but when the user register and/or records, their entry/NameGuide/recording will be automatically copied to any Name Page for which the user was invited. This is useful because users might be invited for multiple Name Pages (different events, classes, businesses, etc.). It is even more useful insofar as it allows seamless integration with the API/Directory Integration Service described below. For example, some customers may want all students or employees or organization members to record their names during matriculation/onboarding/recruitment, or in general. But specific users/Admins in the organization may want to have a Name Page with just the entries/NameGuides/recordings relevant to a particular event or purpose (e.g., for a graduation for an awards ceremony, for given business team or meeting). Therefore, uploading an Excel®/CSV file with just that set of user email addresses automatically creates a name page with just those entries for those users in that set who are already in the system, and invites any users needed for that Name Page (in the set) who are not already in the NameCoach system. Since a given user can have multiple entries in the name module 142, for example, different entries associated with different Name pages, an interface is provided that allows one to tailor their NameGuides for different purposes. Interface 900 of FIG. 9 is one example. The interface 900 includes individual name guides 902, 904, and 906 for different events. For example, a full name may be specified for a graduation or an awards ceremony. A short form name may be specified for a classroom setting or business meetings.

FIG. 2 discloses an operation of supplying data store navigation tools 218. FIG. 10 illustrates an interface 1000 corresponding to such an operation. The interface includes a column 1002 with names and email addresses. The column may also include other information, such as student or employee identification. A column 1004 has notes from the owner of the name (e.g., the "d" is soft). Column 1006 has audio information. That is, invoking the play button associated with a name results in an audio articulation of the name. Column 1008 has administrator notes. The administrator notes may include phonetic notes by the administrator. The notes may be entered after listening to the audio information. Such notes are often more useful to the administrator than the owner's own phonetic notes. Finally, column 1010 has prompts for actions, such as sending an email or deleting an entry. For example, an email may be sent requesting an individual to re-record a name.

Figure 11:
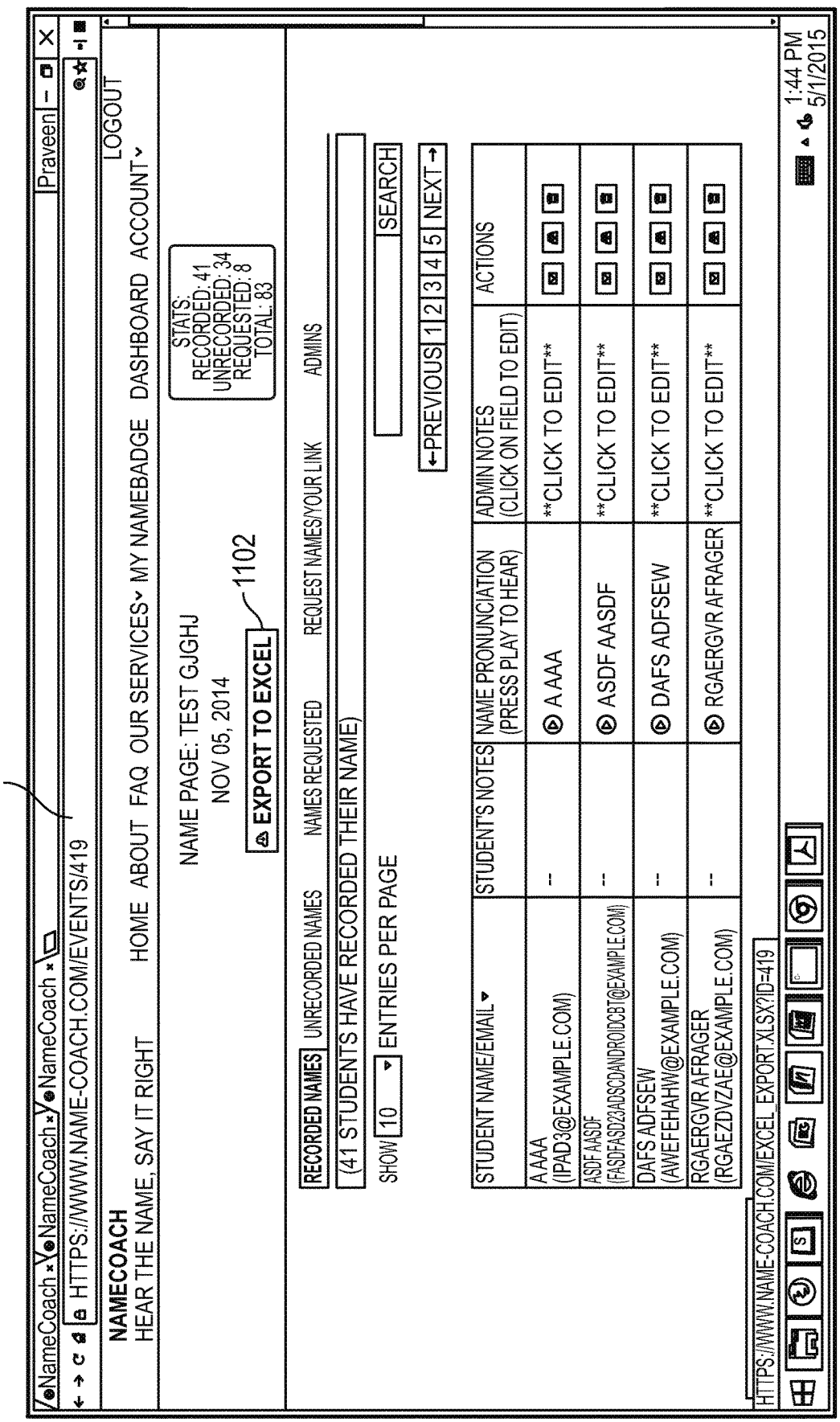
FIG. 11 is an interface to prompt a user to export name information to an external file format.
Figure 12:
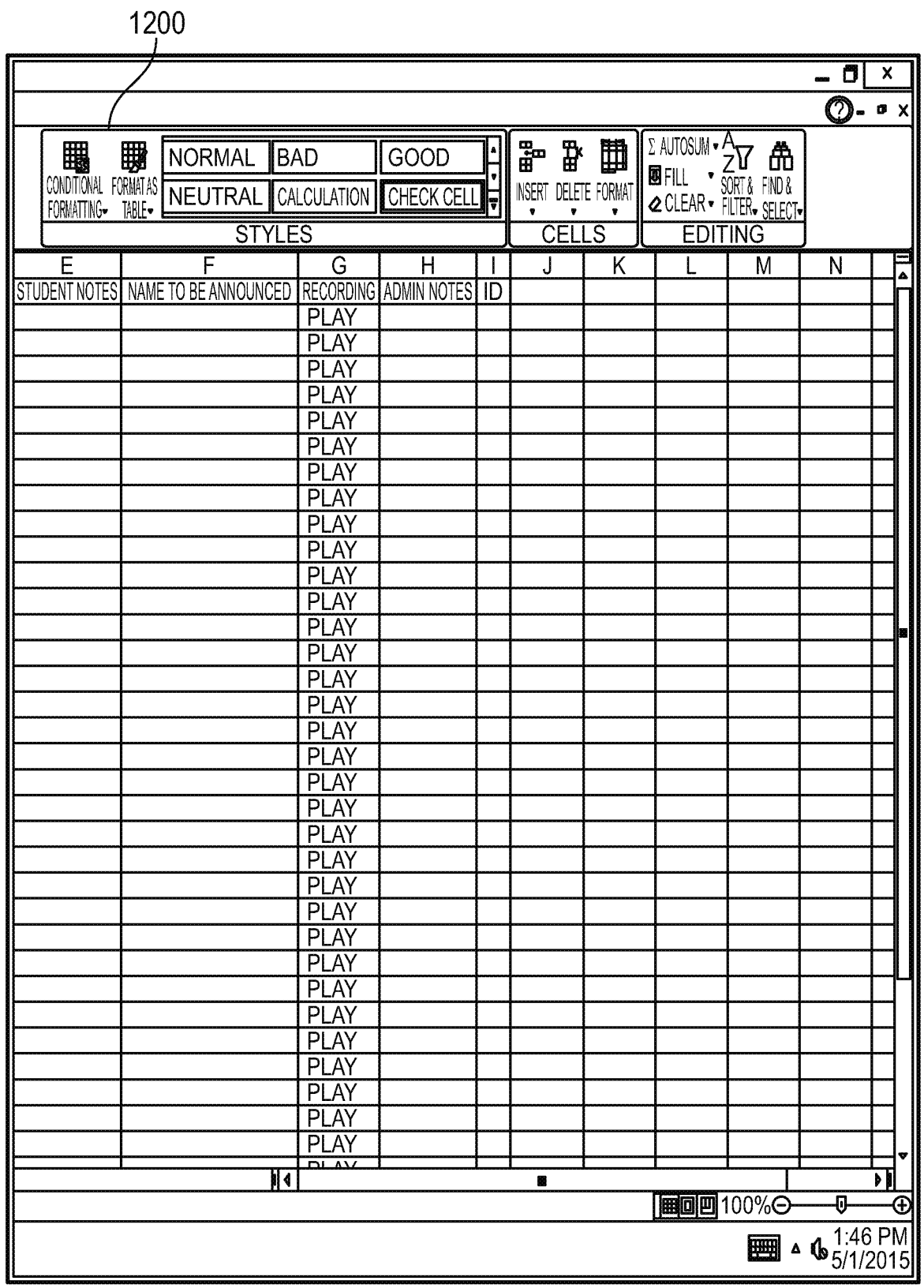
FIG. 12 is an example of name information in an external file format.
Like reference numerals refer to corresponding parts throughout the several views of the drawings.

The information in FIG. 10 may be exported to another file format. FIG. 11 illustrates an interface 1100 with a prompt 1102 to export information to an Excel®) file. FIG. 12 illustrates the resulting file 1200.

An embodiment of the invention includes the name module 142 supporting an API to allow a customer to retrieve information about users on their Name Page(s) programmatically and embed that information (including recordings) in their own systems or third party systems. For example, a school can embed student name recordings into their Student Information System, so that teachers can get name recordings along with their class lists. A business can embed employee name recordings into their business directory by placing a speaker button next to the name of each employee on their profile. A website can embed name recordings on the profiles of each user, e.g., a job search website can embed name recordings on the profile of each job applicant.

The name module 142 has a link associated with each individual. A user can embed her link in an email message, a social network, an SMS text, etc. Activation of the link results in a call to the name module 142. The name module can then supply audio and textual name information. In one embodiment, the name module 142 supports a search function that allows third parties to search for a name to access audio and textual name information. Embodiments of the invention allow the textual name information and audio name information to be supplemented with a photo of the user, information on the origin of the name, meaning of the name, story behind the name and the like. An embodiment of the name module 142 supports search, sort and pagination functionality with respect to the names in a name page. The name module 142 may also be configured to send automatic reminders to individuals that have not recorded a name. The name module 142 may also be configured to selectively supply locked or read-only versions of a name page to certain individuals.

An embodiment of the present invention relates to a computer storage product with a non-transitory computer readable storage medium having computer code thereon for performing various computer-implemented operations. The media and computer code may be those specifically designed and constructed for the purposes of the present invention, or they may be the kind well known and available to those having skill in the computer software arts. Examples of computer-readable media include, but are not limited to: magnetic media, optical media, magneto-optical media and hardware devices that are specifically configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA® C++, or other object oriented programming language and development tools. Another embodiment of the invention may be implemented in hardwired circuitry in place of, or in combination with, machine-executable software instructions.

The foregoing description, for the purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A method, comprising:
   providing a processor and a memory for storing computer instructions which are executed by the processor;
   receiving, by the processor, a name page from an administrator machine that identifies a list of participants for an organizer-specified event who are to receive an invitation to the event, the name page including a name of each of the participants and contact information for each of the participants in the list of participants provided by only the organizer for the event;
   identifying, by the processor, which participants in the list of participants do not have name pronunciation information stored in the memory;
   transmitting, by the processor and using the contact information, an invitation to each of the identified participants specifying the event associated with the invitation, and a time and a location of the event, the invitation further including a personalized request for each of the identified participants for whom name pronunciation is not stored in the memory to provide name pronunciation information;
   receiving, by the processor, in response to the request for each of the participants to provide name pronunciation information for the event, name pronunciation information; and
   storing, by the processor and in the memory, the received name pronunciation information.

2. The method of claim 1, wherein the invitation is transmitted by email.

3. The method of claim 2, wherein the personalized request for each participant includes a unique recording link for each participant.

4. The method of claim 1, wherein the invitation is transmitted as a telephone call.

5. The method of claim 4, wherein the personalized request for each participant includes placing the telephone call to a particular user.

6. The method of claim 1, wherein the invitation is transmitted by SMS text communication.

7. The method of claim 6, wherein the personalized request for each participant includes a unique recording link for each participant.

8. The method of claim 1 further comprising:
   providing, by the processor via a graphical user interface, statistics representative of the total number of identified participants for the event for whom name pronunciation information is not stored in memory.

9. The method of claim 8, further comprising:
   updating, by the processor via the graphical user interface, the statistics representative of the total number of identified participants for the information even for whom name pronunciation is not stored in memory in response to the receiving of name pronunciation from one or more of the identified participants.

10. The method of claim 1, further comprising updating the name page to indicate that name pronunciation information has been stored in memory for one of the identified participants.

11. The method of claim 1, further comprising, transmitting a message to one of the invited participants requesting that the one of the invited participants re-provide name pronunciation information.

12. A device, comprising:
    a processor; and
    a memory connected to the processor which stores instructions which, when executed by the processor, cause the processor to:
    receive a name page from an administrator machine that identifies a list of participants for an organizer-specified event who are to receive an invitation to the event, the name page including a name of each of the participants and contact information for each of the participants in the list of participants provided by only the organizer for the event;
    identify which participants in the list of participants do not have name pronunciation information stored in the memory;
    transmit, using the contact information, an invitation to each of the identified participants specifying the event associated with the invitation, and a time and a location of the event, the invitation further including a personalized request for each of the identified participants for whom name pronunciation is not stored in the memory to provide name pronunciation information;
    receive, in response to the request for each of the participants to provide name pronunciation information for the event, name pronunciation information; and
    store, in the memory, the received name pronunciation information.

13. The device of claim 12, wherein the invitation is transmitted by email.

14. The method of claim 12, wherein the invitation is transmitted as a telephone call.

15. The method of claim 12, wherein the invitation is transmitted by SMS text communication.

16. The method of claim 12, wherein the personalized request for each participant includes a unique recording link for each participant.

17. The method of claim 12, further comprising:
    providing, by the processor via a graphical user interface, statistics representative of the total number of identified participants for the event for whom name pronunciation information is not stored in memory.

18. The method of claim 17, further comprising:

updating, by the processor via the graphical user interface, the statistics representative of the total number of identified participants for the information even for whom name pronunciation is not stored in memory in response to the receiving of name pronunciation from one or more of the identified participants.

19. The method of claim 12, further comprising updating the name page to indicate that name pronunciation information has been stored in memory for one of the identified participants.

20. The method of claim 12, further comprising, transmitting a message to one of the invited participants requesting that the one of the invited participants re-provide name pronunciation information.

* * * * *